United States Patent
el Khoury et al.

(10) Patent No.: US 10,887,317 B2
(45) Date of Patent: Jan. 5, 2021

(54) PROGRESSIVE AUTHENTICATION SECURITY ADAPTER

(71) Applicant: SAP SE, Walldorf (DE)

(72) Inventors: Paul el Khoury, Shanghai (CN); Chang Liu, Shanghai (CN); Li Dong, Shanghai (CN); Nicolas Rousseau, Shanghai (CN); Chu Yunxiao Zhong, Shanghai (CN)

(73) Assignee: SAP SE, Walldorf (DE)

( * ) Notice: Subject to any disclaimer, the term of this patent is extended or adjusted under 35 U.S.C. 154(b) by 220 days.

(21) Appl. No.: 16/203,312

(22) Filed: Nov. 28, 2018

(65) Prior Publication Data

US 2020/0169561 A1    May 28, 2020

(51) Int. Cl.
*H04L 29/06* (2006.01)
*G06N 20/10* (2019.01)

(52) U.S. Cl.
CPC .......... *H04L 63/102* (2013.01); *G06N 20/10* (2019.01); *H04L 63/08* (2013.01); *H04L 63/083* (2013.01); *H04L 2463/082* (2013.01)

(58) Field of Classification Search
CPC ....... H04L 2463/082; H04L 29/062755; H04L 9/32; H04L 9/3226; G06F 21/32; H04N 21/4415
See application file for complete search history.

(56) References Cited

U.S. PATENT DOCUMENTS

| | | | |
|---|---|---|---|
| 9,569,605 B1 | 2/2017 | Schneider et al. | |
| 2005/0228993 A1* | 10/2005 | Silvester | H04L 9/3231 713/168 |
| 2008/0015986 A1* | 1/2008 | Wright | G06Q 20/40 705/44 |
| 2013/0036462 A1 | 2/2013 | Krishnamurthi et al. | |
| 2013/0223696 A1 | 8/2013 | Azar et al. | |
| 2014/0250523 A1 | 9/2014 | Savvides et al. | |
| 2016/0180068 A1 | 6/2016 | Das et al. | |
| 2017/0227995 A1* | 8/2017 | Lee | H04L 63/0892 |

* cited by examiner

*Primary Examiner* — Ali S Abyaneh
(74) *Attorney, Agent, or Firm* — Jones Day

(57) ABSTRACT

Authentication data for providing access to a resource to a user is received from a requester. The authentication data encapsulates data required by both a first authentication solution and a second authentication procedure both for providing access to a resource. The first and second authentication solutions can differ in authentication modality with the second authentication solution utilizing at least one machine learning model. Thereafter, using the received authentication data, both of the first and second authentication solutions are initiated. Authentication results are received from both of the first and second authentication solutions. The requester is provided with access to the resource if the both of the received authentication results indicate that authentication of the user was successful. Related apparatus, systems, techniques and articles are also described.

20 Claims, 6 Drawing Sheets

PROGRESSIVE AUTHENTICATION SECURITY ADAPTER

TECHNICAL FIELD

The subject matter described herein relates to enhanced techniques for providing access to resources using various authentication modalities including at least one modality using machine learning.

BACKGROUND

Artificial intelligence, and in particular, machine learning is being increasingly used for authentication of users to provide them with access to resources. One particular type of widely adopted machine learning-based authentication is facial recognition such as that provided on certain smartphones. Facial recognition, as an authentication solution, has some drawbacks in nature. For example, the face image of a person is not stable, there are always differences in different lighting condition and such that person's look changes slightly every day. Hence, a face recognition algorithm forming part of an authentication solution must, in practice, having variable false accept rates and false reject rates. An improper setup of a face recognition configuration can inadvertently increase the false accept rate, and lead to inaccurate user authentications.

Moreover, machine learning-based authentication techniques, when not properly trained, are more susceptible to various attack paths. For example, there may be implementation vulnerabilities in the application utilizing the machine learning-based authentication techniques. A person's identity might be able to be spoofed via images, videos, 3-D printer representations, virtual reality, augmented reality and the like. The impact of such attacks on face recognition authentication solutions can be severe in that they might allow illegitimate access to the phones, building premises or any other application where it is being used. Illegitimate access to phones can allow theft of banking credentials and intimate photos and data on the phone while illegitimate access to building premises would allow poisoning of employees or illegitimate access to source code. In the meantime, an improperly trained machine learning-based authentication solution can have a high error rate which would block resource access to legitimate users, causing inconveniences and chaos in real life.

SUMMARY

In a first aspect, authentication data for providing access to a resource to a user is received from a requester. The authentication data encapsulates data required by both a first authentication solution and a second authentication procedure both for providing access to a resource. The first and second authentication solutions can differ in authentication modality with the second authentication solution utilizing at least one machine learning model. Thereafter, using the received authentication data, both of the first and second authentication solutions are initiated. Authentication results are received from both of the first and second authentication solutions. The requester is provided with access to the resource if the both of the received authentication results indicate that authentication of the user was successful.

The requester can be prevented from accessing the resource if at least one of the authentication results indicate that the authentication of the user was not successful. In addition, with such variations, an indication can be provided (e.g., displayed, transmitted, stored, etc.) to the requester that the authentication of the user was not successful.

The requester can be prevented from accessing the resource if the first authentication solution indicates that the authentication of the user was not successful while the second authentication solution indicates that the authentication of the user was successful. In addition, with such variations, an indication can be provided (e.g., displayed, transmitted, stored, etc.) to the requester that the authentication of the user was not successful.

A reliability ratio can be checked for the user if the first authentication solution indicates that the authentication of the user was successful and the second authentication solution indicates that the authentication of the user was not successful, the reliability ratio characterizing a level of training of the machine learning model utilized by the second authentication solution. The requester can be provided with access to the resource if the reliability ratio is above a pre-defined threshold. Alternatively, the requester can be prevented from accessing the resource if the reliability ratio is below a pre-defined threshold.

The second authentication solution can utilize biometric data derived from the user. The biometric data can include, for example, one or more of: facial image, sound recording, voice recording, fingerprint, or a handprint.

The resource can take varying forms such as digital/computing resources including computer systems, software applications, or a computer data file. Alternatively, the resource can be a physical asset such as gate, lock, or other physical world item or obstacle.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter can be used to selectively onboard a machine learning-based authentication technique while the corresponding models are being trained. Such an arrangement is advantageous in that machine learning requires a lot of high quality training data to train models and the quality of data has direct impact on the accuracy of such models. In particular, for supervised learning, a tagged training data set covering different kinds of possible data is important to train a stable and reliable model.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
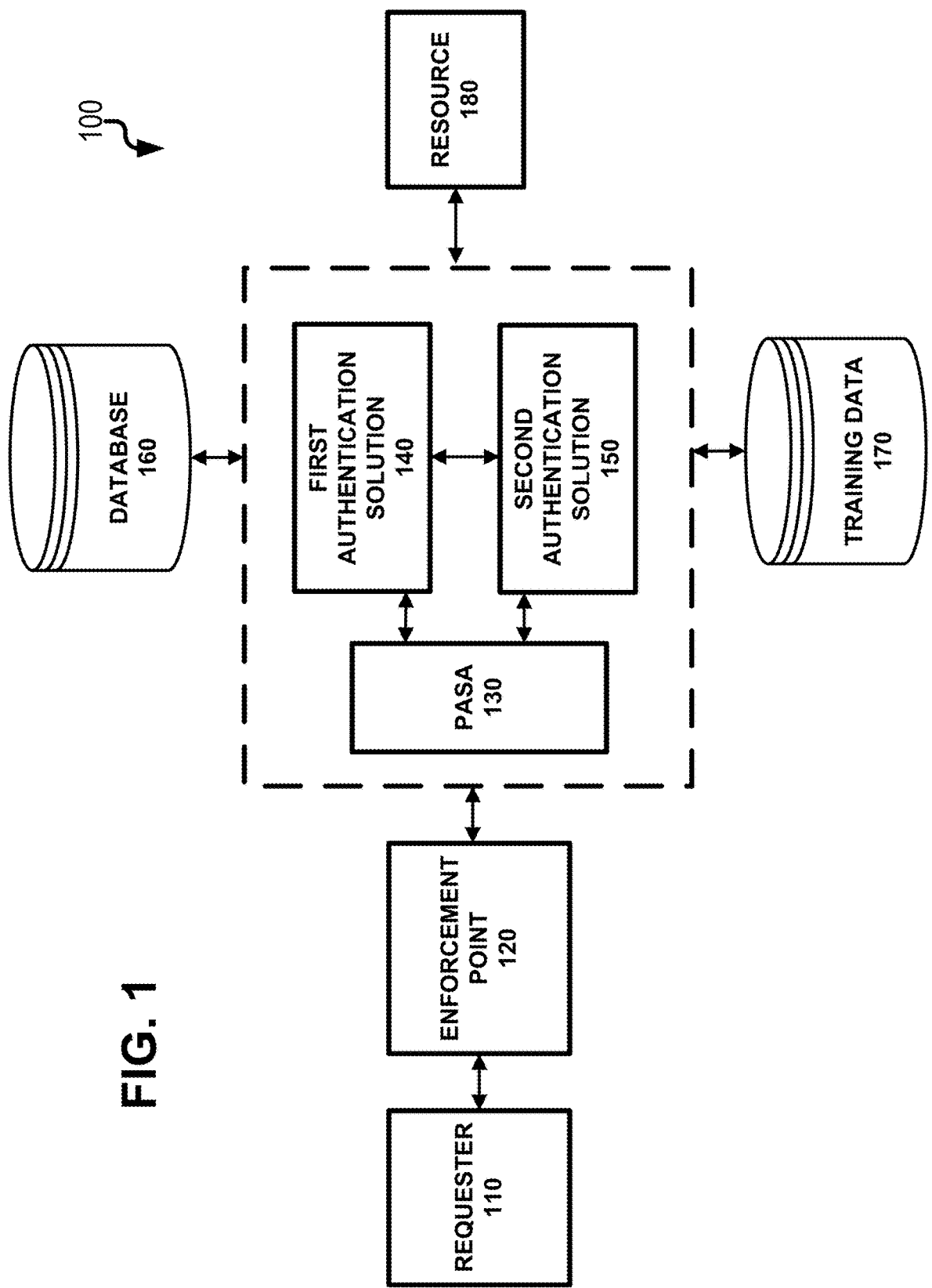
FIG. 1 is a diagram illustrating a computing environment for implementing a progressive security adapter.

FIG. 1 is a logical architecture diagram 100 in which a requester 110 (i.e., a computing node accessed by a user) is coupled to a progressive security adapter 130 (PASA) by way of an enforcement point 120. The PASA 130 can selectively access first and second authentication solutions 140, 150 which use different authentication modalities. For example, the first authentication solution 140 can be a password/passcode authentication solution which confirms the accuracy of the entered data based on data stored within a database 160 (accessible by such first authentication solution 140). The second authentication solution 150 can be an authentication solution that utilizes machine learning. In some cases the second authentication solution 150 is self-contained (i.e., it is fully trained, etc.) while, in other cases, the second authentication solution 150 can access, update, or otherwise leverage training data stored in a training data database 170. Example modalities include face recognition, voice recognition, biometric recognition (e.g., fingerprint, handprint, user movement as detected by a touchpad, keypad, camera, etc.). As will be described below, the PASA 130 based on feedback from one or more of the authentication solutions 140, 150 can provide access to a resource 180. The resource 180 can be, for example, data (e.g., text, audio, video, etc.), a computer system, or it can be a trigger to allow access to a physical asset. For example, the resource 180 can be an instruction to open a secured door or gate.

Referring again to FIG. 1, the enforcement point 120 can represent one or more systems in charge of forwarding requests originating from the requested 110 to the authentication solution. In particular, the enforcement point 120 can intercept authentication requests from the requester 110 and then relay them (either wholly or after being parsed or otherwise modified) to the PASA 130. The requester 110 can send authentication requests to the enforcement point 120. These authentication requests can be encapsulate various types of data such as a username/password combination and/or data representing a biometric attribute (e.g., a vector characterizing a facial image obtained from a camera on a phone, doorbell, kiosk, etc.)

With the current computing framework incorporating the PASA 130, the PASA 130 can coordinate between the first authentication solution 140 (which can, in some implementations, be characterized as a traditional authentication solution) and the second authentication solution 150 which uses machine learning. It will be appreciated that the first authentication solution 140 can also use machine learning. In such cases, the first authentication solution 140 can have a greater level of training as compared to the second authentication solution 150 making it potentially more reliable at such given moment. Moreover, in some cases, the output of the first authentication solution 140 can be used to train the second authentication solution 150 as described below with regard to normal and easy modes.

Further, the PASA 130 can selectively activate the second authentication solution 150 only when such solution has been properly trained or otherwise provides accuracy above a pre-defined or desired threshold or when other conditions are met. For example, the PASA 130 can take into account a sensitivity of the resource 180 being protected, a historical reliability of the second authentication solution 150 (both in average and for the specific requester), and a reliability threshold of the second authentication solution 150. It will be appreciated that the PASA 130 can also be used to switch among more than two authentication solutions depending on the desired configuration. For example, more than two authentication solutions might be required when accessing a resource 180 for the first time and/or based on a role of the requesting user 110.

The second authentication solution 150 (and in some variations, the first authentication solution 140) can use various types of machine learning models. Example machine learning models include, without limitation, logistic regression, support vector machines, neural networks (e.g., concurrent neural networks, recurrent neural networks, deep learning, etc.), random forests, and the like. These models can be trained, in some cases, using user authentication data unique to a particular user while, in other cases, it can be trained using authentication data obtained from a group of users while, in still other cases, such models can be trained using a combination of user unique authentication data and authentication data from a group of users.

In some variations, the PASA 130 can selectively switch between the first and second authentication solutions 140, 150 when various modes are met. These modes, for illustrative purposes herein, can include a strict mode, a normal mode, and an easy mode. The mode can be triggered, for example, when the request is received by the PASA 130. For example, the request might be for a resource 180 requiring a higher level of authentication and/or the request might be from a user that requires a higher level of authentication level or the converse.

The strict mode can be used for highly sensitive resources 180 in which the output of both the first authentication solution 140 and the second authentication solution 150 in determining whether to provide access to the resource 180.

The normal mode can be used for medium sensitive resources 180 such that the output of first authentication solution 140 is weighted greater than the output of the second authentication solution 150 while the second authentication solution 150 is being trained. If a conflict occurs between the output of the first authentication solution 140 and the second authentication solution 150, in some variations, a warning (i.e., message, e-mail, etc.) can be given (e.g., displayed to a security guard, e-mailed to a system administrator, etc.) to confirm the identity of the requester 110. In some cases, the conflicting outputs of the first authentication solution 140 and the second authentication solution 150 can form part of the training data 170 (which in turn is used to train the model(s) used as part of the second authentication solution 150).

In the easy mode, the second authentication solution 150 takes priority after it is sufficiently trained. The first authentication solution 140 can, in such cases, be used to provide labeled training data (to enable supervised/semi-supervised learning) which forms part of the training data 170. In addition or in the alternate, in the easy mode, the first authentication solution 140 can be used to provide double verification for individuals whose recognition reliability (via the second authentication solution 150) does not meet minimal reliability threshold after enough training.

Figure 2:
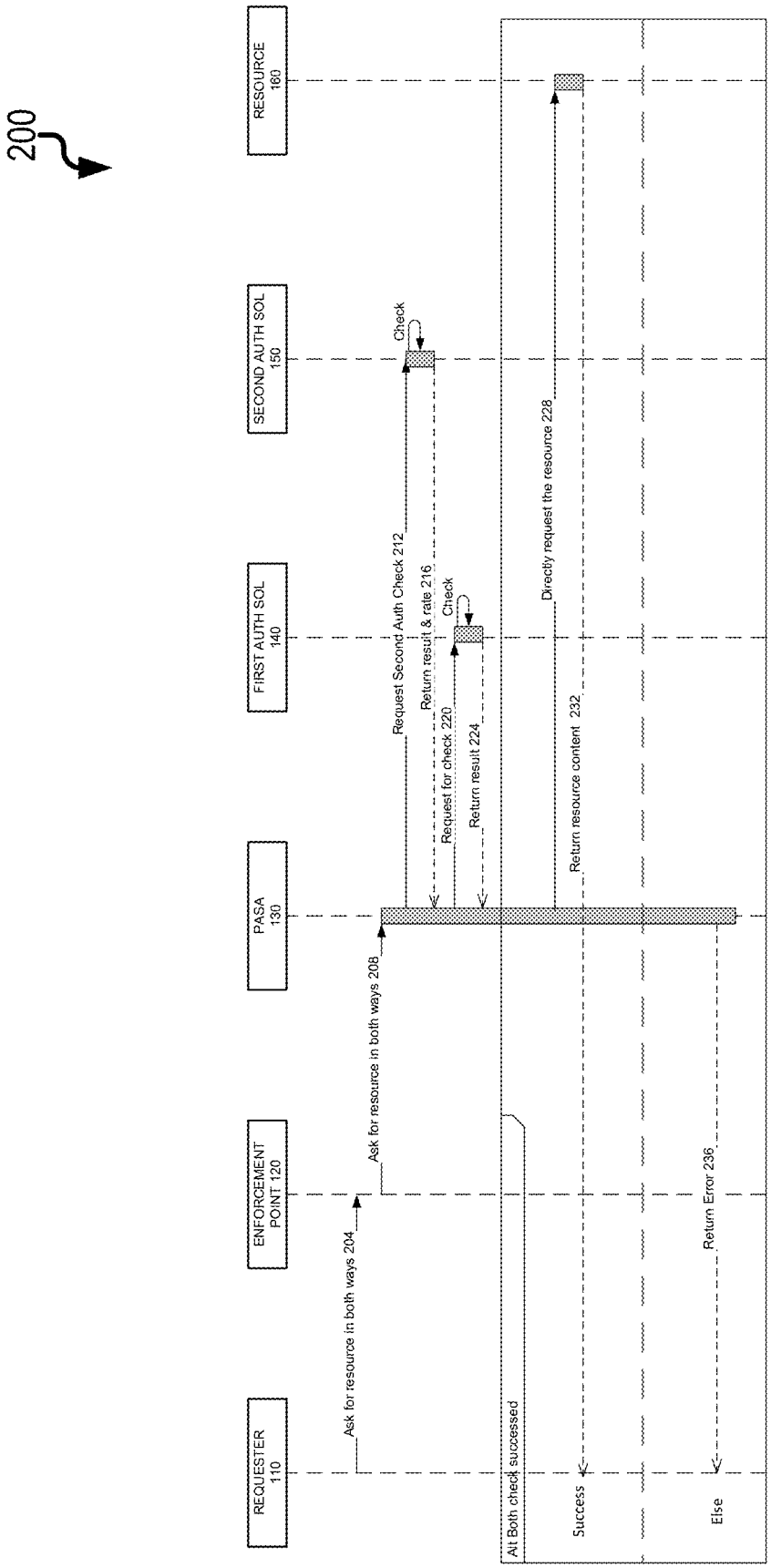
FIG. 2 is a first diagram illustrating data exchange amongst components such as those illustrated in FIG. 1.

FIG. 2 is a signaling diagram 200 illustrating various data exchange amongst the components of FIG. 1 while in the strict mode. Initially, at 204, the requester 110 sends an authentication request with traditional authentication data (e.g., security card token) together with machine learning-based data (e.g., facial image, etc.) to the enforcement point 120. The enforcement point 120, at 208, aggregates such data (if they derive from different sources) and then forwards the requests to the PASA 130. The PASA 130 later, at 212, requests authentication (using the machine learning-based data) from the second authentication solution 150 which, at 216, returns a result therefrom to the PASA 130. In addition, the PASA 130, at 220, requests authentication (using the traditional authentication data) from the first authentication solution 140 which, at 224, returns a result therefrom to the PASA 130. Based on both results, the PASA 130 then either (i) requests, at 228, the resource 180 and returns, at 232, the resource 180 to the requester 110 if both results indicate authentication or, alternatively, (ii) returns an error or other message, at 236, to the requester 110 indicating that the authentication failed.

Figure 3:
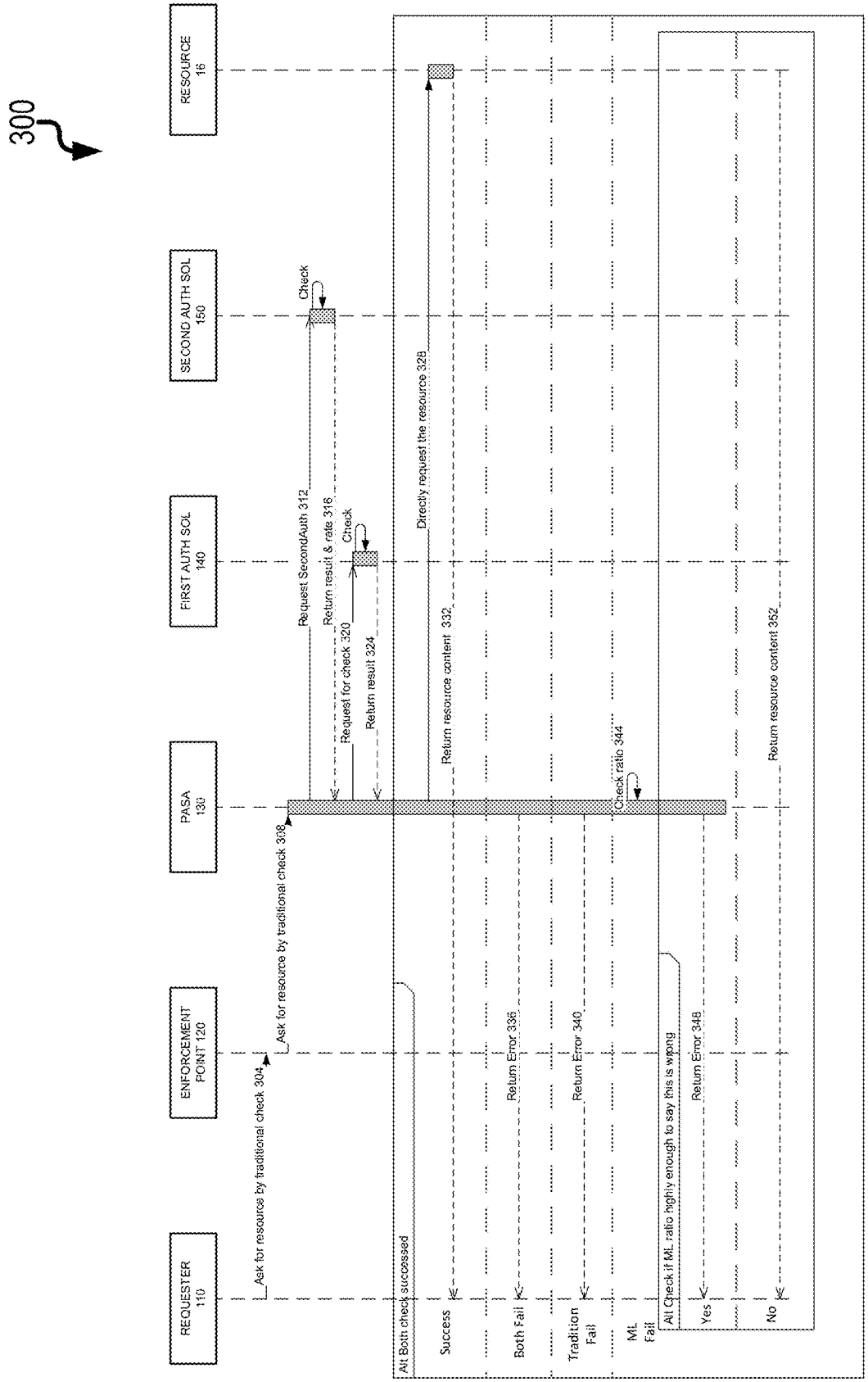
FIG. 3 is a second diagram illustrating data exchange amongst components such as those illustrated in FIG. 1.

FIG. 3 is a signaling diagram 300 illustrating various data exchange amongst the components of FIG. 1 while in the normal mode. Initially, at 304, the requester 110 sends an authentication request with traditional authentication data (e.g., security card token) together with machine learning-based data (e.g., facial image, etc.) to the enforcement point 120. The enforcement point 120, at 308, aggregates such data (if they derive from different sources) and then forwards the requests to the PASA 130. The PASA 130 later, at 212, requests authentication (using the machine learning-based data) from the second authentication solution 150 which, at 316, returns a result therefrom to the PASA 130. In addition, the PASA 130, at 320, requests authentication (using the traditional authentication data) from the first authentication solution 140 which, at 324, returns a result therefrom to the PASA 130. Based on both results, the PASA 130 then (i) requests, at 328, the resource 180 and returns, at 232, the resource 180 to the requester 110 if both returned results indicate authentication, (ii) returns, if both authentication solutions 140, 150 indicate failure, an error or other message, at 336, to the requester 110 indicating that the authentication failed, or (iii) returns, if only the first authentication solution 140 indicated failure, an error or other message, at 340, to the requester 110 indicating that the authentication failed. If only the second authentication solution 150 indicates that authentication failed, then, at 344, a reliability ratio for the requester 110 is checked. The reliability ratio can be calculated by the percentage of count of consistent authentication results between the two authentication solutions dividing the count of total authentication requests. If the reliability ratio is below a pre-defined threshold then, at 348, an error or other message is sent to the requester 110 indicating that the authentication failed. If the reliability ratio is above a pre-defined threshold, then, at 352, the resource 180 is provided to the requester 110. Other messages/indications can be provided in such a situation such as a notification to a security guard requesting him or her to confirm the physical identification of a person attempting to gain access to the resource 180.

Figure 4:
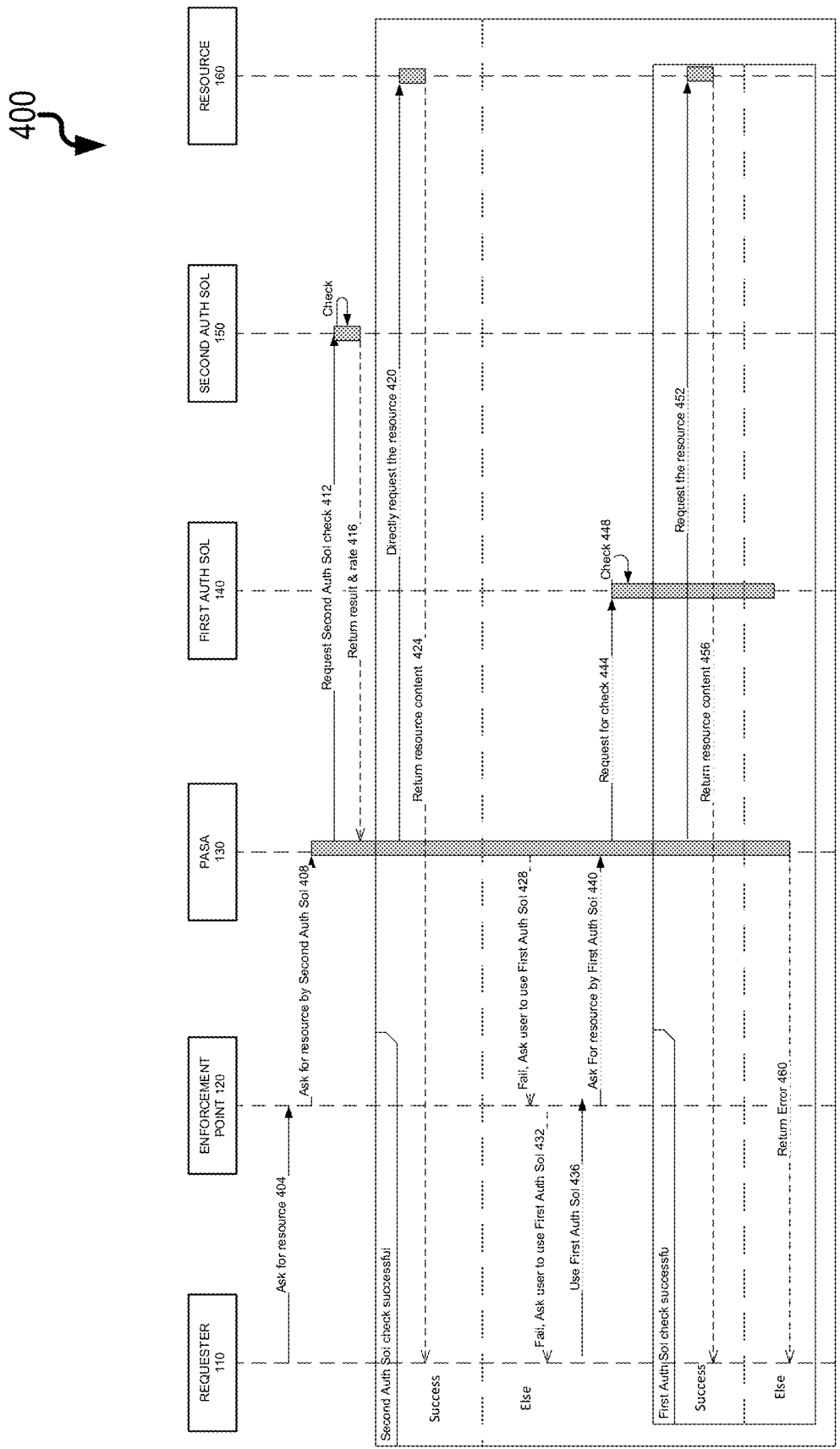
FIG. 4 is a third diagram illustrating data exchange amongst components such as those illustrated in FIG. 1.

FIG. 4 is a signaling diagram 400 illustrating various data exchange amongst the components of FIG. 1 while in the easy mode. Initially, at 404, the requester 110 sends an authentication request with machine learning-based data (e.g., facial image, etc.) to the enforcement point 120. The enforcement point 120, at 408, forwards the request to the PASA 130. The PASA 130 later, at 412, requests authentication (using the machine learning-based data) from the second authentication solution 150 which, at 416, returns a result therefrom to the PASA 130. If the authentication by the second authentication solution 150 is successful, at 420, the PASA 130 requests the resource 180 and, at 424, the resource 180 is provided to the requester 110.

If the authentication by the second authentication solution 150 is not successful, the PASA, at 428, requests the enforcement point 120 to request, at 432, the requester 110 to obtain authentication data suitable for the first authentication solution 140 (e.g., traditional authentication data, etc.). The requester 110 ultimately obtains such authentication data and, at 436, forwards it to the enforcement point 120 for relay, at 440, to the PASA 130. The PASA 130 then, at 444, sends the most recently received authentication data to the first authentication solution 448 which, in turn, at 452, checks whether the authentication data is sufficient to authenticate the requester 110 using the techniques of the first authentication solution 140. If such authentication is successful, the PASA 130, at 456 sends a request for the resource 180 to be sent, at 460, directly to the requester 110. If such authentication is not successful, then, at 464, a message or other indication can be sent back to the requester 110 indicating same. The reliability ration of the user can then be updated (please explain this further).

Figure 5:
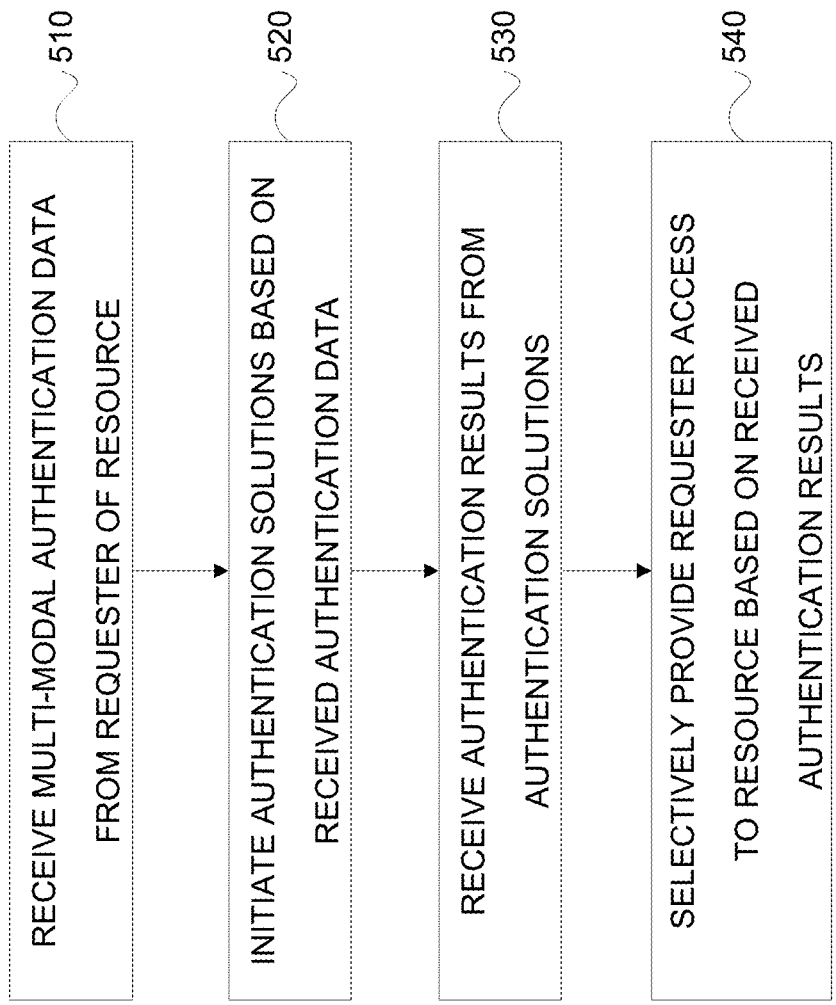
FIG. 5 is a process flow diagram illustrating techniques for providing progressive authentication techniques for access to a resource.

FIG. 5 is a process flow diagram 500 illustrating an arrangement in which, at 510, authentication data is received from a requester. The authentication data is for providing access to a resource to a user and it can encapsulate data required by both a first authentication solution and a second authentication procedure both for providing access to a resource. The first authentication solution and the second authentication solution use or are otherwise based on different authentication modalities with the second authentication solution utilizing at least one machine learning model. The first authentication solution and the second authentication solution are then initiated, at 520, using the received authentication data. Authentication results are later received, at 530, from both of the first authentication solution and the second authentication solution. The requester is, at 540, provided access to the resource if the both of the received authentication results indicate that authentication of the user was successful.

Figure 6:
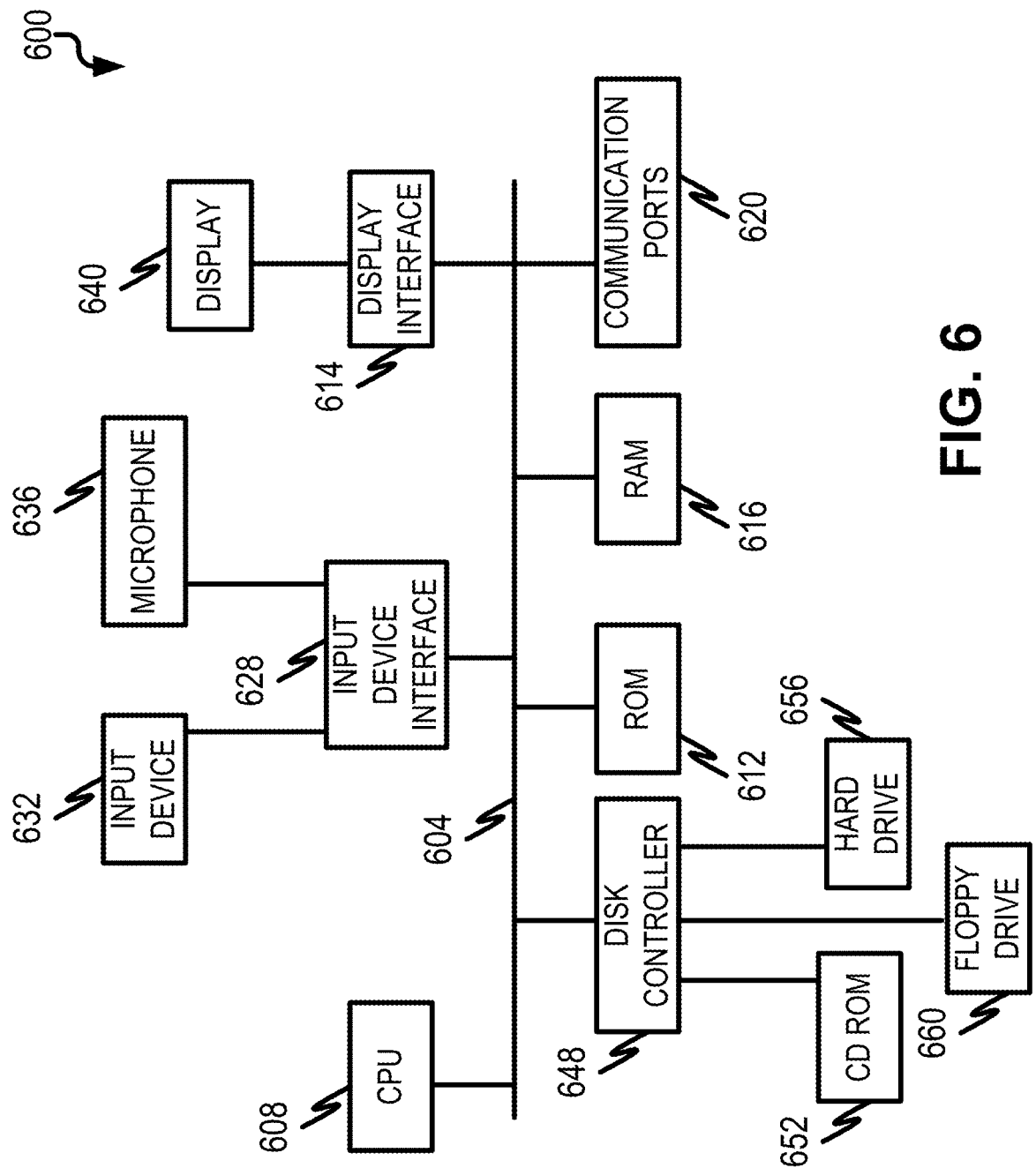
FIG. 6 is a diagram of aspects of a computing device for implementing aspects described and illustrated herein.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. The input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
    receiving, from a requester, authentication data for providing access to a resource to a user, the authentication data encapsulating data required by both a first authentication solution and a second authentication solution both for providing access to a resource, the first authentication solution and the second authentication solution differing in authentication modality with the second authentication solution utilizing at least one machine learning model;

initiating, using the received authentication data, both of the first authentication solution and the second authentication solution;

receiving authentication results from both of the first authentication solution and the second authentication solution;

providing the requester with access to the resource if the both of the received authentication results indicate that authentication of the user was successful;

checking a reliability ratio for the user if the first authentication solution indicates that the authentication of the user was successful and the second authentication solution indicates that the authentication of the user was not successful, the reliability ratio characterizing a level of training of the machine learning model utilized by the second authentication solution; and providing the requester with access to the resource if the reliability ratio is above a pre-defined threshold; and preventing the requester from accessing the resource if the reliability ratio is below a pre-defined threshold.

2. The method of claim 1, wherein the second authentication solution utilizes biometric data derived from the user.

3. The method of claim 2, wherein the biometric data is at least one of: facial image, sound recording, voice recording, fingerprint, or a handprint.

4. The method of claim 1, wherein the resource is a computer system or a computer data file.

5. The method of claim 1, wherein the resource is access to a physical asset.

6. The method of claim 1, wherein the at least one machine learning model comprises: logistic regression models, support vector machines, neural networks, or random forests.

7. The method of claim 1, wherein the first authentication solution and the second authentication solution are accessed by a progressive authentication security adapter (PASA) which selectively provides access to the resource.

8. A system comprising:
at least one data processor; and
memory storing instructions which, when executed by the at least one data processor, result in operations comprising:
receiving, from a requester, authentication data for providing access to a resource to a user, the authentication data encapsulating data required by both a first authentication solution and a second authentication solution both for providing access to a resource, the first authentication solution and the second authentication solution differing in authentication modality with the second authentication solution utilizing at least one machine learning model;
initiating, using the received authentication data, both of the first authentication solution and the second authentication solution;
receiving authentication results from both of the first authentication solution and the second authentication solution;
providing the requester with access to the resource if the both of the received authentication results indicate that authentication of the user was successful;
checking a reliability ratio for the user if the first authentication solution indicates that the authentication of the user was successful and the second authentication solution indicates that the authentication of the user was not successful, the reliability ratio characterizing a level of training of the machine learning model utilized by the second authentication solution; and
providing the requester with access to the resource if the reliability ratio is above a pre-defined threshold; and
preventing the requester from accessing the resource if the reliability ratio is below a pre-defined threshold.

9. The system of claim 8, wherein the second authentication solution utilizes biometric data derived from the user.

10. The system of claim 9, wherein the biometric data is at least one of: facial image, sound recording, voice recording, fingerprint, or a handprint.

11. The system of claim 8 further comprising the resource.

12. The system of claim 8, wherein the resource is a computer system or a computer data file.

13. The system of claim 8, wherein the resource is access to a physical asset.

14. The system of claim 8, wherein the at least one machine learning model comprises: logistic regression models, support vector machines, neural networks, or random forests.

15. A non-transitory computer program product storing instructions which, when executed by at least one data processor forming part of at least one computing system, result in operations comprising:
at least one data processor; and
memory storing instructions which, when executed by the at least one data processor, result in operations comprising:
receiving, from a requester, authentication data for providing access to a resource to a user, the authentication data encapsulating data required by both a first authentication solution and a second authentication solution both for providing access to a resource, the first authentication solution and the second authentication solution differing in authentication modality with the second authentication solution utilizing at least one machine learning model;
initiating, using the received authentication data, both of the first authentication solution and the second authentication solution;
receiving authentication results from both of the first authentication solution and the second authentication solution;
providing the requester with access to the resource if the both of the received authentication results indicate that authentication of the user was successful;
checking a reliability ratio for the user if the first authentication solution indicates that the authentication of the user was successful and the second authentication solution indicates that the authentication of the user was not successful, the reliability ratio characterizing a level of training of the machine learning model utilized by the second authentication solution; and
providing the requester with access to the resource if the reliability ratio is above a pre-defined threshold; and
preventing the requester from accessing the resource if the reliability ratio is below a pre-defined threshold.

16. The non-transitory computer program product of claim 8, wherein the second authentication solution utilizes biometric data derived from the user.

17. The non-transitory computer program product of claim 16, wherein the biometric data is at least one of: facial image, sound recording, voice recording, fingerprint, or a handprint.

18. The non-transitory computer program product of claim 15, wherein the resource is a computer system or a computer data file.

19. The non-transitory computer program product of claim 15, wherein the resource is access to a physical asset.

20. The non-transitory computer program product of 15, wherein the at least one machine learning model comprises: logistic regression models, support vector machines, neural networks, or random forests.

* * * * *